US011620016B2

(12) United States Patent
Suzuki

(10) Patent No.: US 11,620,016 B2
(45) Date of Patent: Apr. 4, 2023

(54) INFORMATION PROCESSING DEVICE AND OPERATION DETECTION DEVICE

(71) Applicant: TDK CORPORATION, Tokyo (JP)

(72) Inventor: Eiji Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/318,854

(22) Filed: May 12, 2021

(65) Prior Publication Data

US 2022/0035474 A1 Feb. 3, 2022

(30) Foreign Application Priority Data

Jul. 30, 2020 (WO) .................. PCT/JP2020/029277
Feb. 16, 2021 (JP) ............................ JP2021-022468

(51) Int. Cl.

| | |
|---|---|
| ***G06F 3/041*** | (2006.01) |
| ***G06V 40/20*** | (2022.01) |
| ***G06F 3/046*** | (2006.01) |
| ***G06F 3/044*** | (2006.01) |
| ***G06F 3/045*** | (2006.01) |

(52) U.S. Cl.
CPC ............ *G06F 3/0418* (2013.01); *G06V 40/20* (2022.01); *G06F 3/044* (2013.01); *G06F 3/045* (2013.01); *G06F 3/046* (2013.01)

(58) Field of Classification Search
None
See application file for complete search history.

(56) References Cited

U.S. PATENT DOCUMENTS

2017/0110504 A1 4/2017 Panchawagh et al.
2017/0212619 A1 7/2017 Sharma
2019/0146619 A1* 5/2019 Kurasawa ........... G02F 1/13338
345/173

FOREIGN PATENT DOCUMENTS

JP 2001-075466 A 3/2001
JP 2005-049304 A 2/2005
JP 2007-085866 A 4/2007
JP 2009-244234 A 10/2009
JP 2016-177343 A 10/2016
JP 2019-503095 A 1/2019
JP 2019-508758 A 3/2019

OTHER PUBLICATIONS

Oct. 20, 2020 International Search Report issued in International Application No. PCT/JP2020/029277.

* cited by examiner

*Primary Examiner* — Stephen T. Reed
(74) *Attorney, Agent, or Firm* — Oliff PLC

(57) ABSTRACT

An information processing device includes a transmission terminal configured to transmit an input signal and a plurality of reception terminals configured to receive information output from the transmission terminal as a signal. A signal received by one of the plurality of reception terminals is configured to be able to interact with signals received by the other reception terminals.

2 Claims, 13 Drawing Sheets

203
42
41
40
50
30
TT2
W
W
RT
RT
RT
TT
12
20

201
50
30
12
20
40
41
42
W
TT
RT
RT
RT 203
50
30
40
41
42
12
20
TT2
TT
W
W
RT
RT
RT

INFORMATION PROCESSING DEVICE AND OPERATION DETECTION DEVICE

CROSS-REFERENCE TO RELATED APPLICATION

Priority is claimed on PCT International Application No. PCT/JP2020/029277, filed Jul. 30, 2020, and Japanese Patent Application No. 2021-022468, filed Feb. 16, 2021, the content of which is incorporated herein by reference.

BACKGROUND OF THE INVENTION

Field of the Invention

The present invention relates to an information processing device and an operation detection device.

Description of Related Art

Capacitive sensors are used in touch panels and the like of mobile terminals. For example, a touch sensor described in Patent Document 1 detects a touch position from a change in capacitance at an intersection of a plurality of column direction electrodes and a plurality of row direction electrodes. Patent Document 1 uses machine learning to classify whether or not the input to the touch sensor has been intended by the user.

[Patent Documents]

[Patent Document 1] Japanese Unexamined Patent Application, First Publication No. 2016-177343

SUMMARY OF THE INVENTION

A touch sensor may be required to recognize more complex gesture operations of a user so that an advanced process is performed. However, because the touch sensor described in Patent Document 1 detects the touch position by scanning the column direction electrodes and the row direction electrodes in order, the detection is time-consuming. Also, the touch sensor described in Patent Document 1 can only track information of a touched key point, and it is difficult to reliably classify the operation when a gesture of the user becomes complex. This problem is not limited to a touch sensor, and the same is true for other sensors.

The present invention has been made in view of the above circumstances, and an objective of the present invention is to provide an information processing device and an operation detection device capable of recognizing more complex gesture operations of a user.

(1) According to a first aspect, there is provided an information processing device including: a transmission terminal configured to transmit an input signal; and a plurality of reception terminals configured to receive information output from the transmission terminal as a signal, wherein a signal received by one of the plurality of reception terminals is configured to be able to interact with signals received by the other reception terminals.

(2) According to the above-described aspect, the information processing device may include a plurality of electrodes, wherein at least one of the plurality of electrodes may be the transmission terminal, wherein at least two of the plurality of electrodes may be the reception terminals, wherein the transmission terminal may be a drive electrode to which the signal is input, wherein the reception terminal may be a detection electrode for detecting information from the drive electrode, wherein a field generated by each of the plurality of electrodes may affect at least a nearby electrode and each of the plurality of electrodes interacts with at least the nearby electrode, wherein at least two of the plurality of electrodes may be connected via a circuit, and wherein the circuit may have at least one selected from a group consisting of a resistor, a capacitor, and a coil.

(3) According to the above-described aspect, in the information processing device, the circuit may cause a transient phenomenon and a decay time of the circuit may be twice or more an interval between the signals input to the drive electrode.

(4) According to the above-described aspect, in the information processing device, at least two of the plurality of electrodes may be electrically connected via a switching element.

(5) According to the above-described aspect, the information processing device may further include a signal generator configured to input a signal to the drive electrode; a classifier configured to classify a signal from the detection electrode; and a feedback device configured to transmit part of the signal from the detection electrode to the classifier to the signal generator.

(6) According to the above-described aspect, in the information processing device, the feedback device may include a signal retention unit configured to retain a signal from the detection electrode temporarily; and a signal transmission unit configured to transmit the signal retained in the signal retention unit to the signal generator after the elapse of a predetermined period.

(7) According to the above-described aspect, the information processing device may further include a feedback device, wherein the transmission terminal may output waves as a signal, wherein each of the plurality of reception terminals may receive waves as a signal, and wherein the feedback device may feed a signal received by a first reception terminal among the plurality of reception terminals back to the transmission terminal or any reception terminal.

(8) According to the above-described aspect, in the information processing device, the feedback device may be connected to the first reception terminal and the transmission terminal, and the feedback device may feed the signal received by the first reception terminal back to the transmission terminal.

(9) According to the above-described aspect, in the information processing device, the feedback device may be connected to the first reception terminal and a second reception terminal different from the first reception terminal, and the feedback device may feed the signal received by the first reception terminal back to the second reception terminal.

(10) According to the above-described aspect, in the information processing device, the feedback device may be connected to the first reception terminal, and the feedback device may feed the signal received by the first reception terminal back to the first reception terminal again.

(11) According to the above-described aspect, the information processing device may further include an external transmission terminal configured to transmit an input signal, wherein the feedback device may be connected to the first reception terminal and the external transmission terminal and wherein the feedback device may feed the signal received by the first reception terminal back to the external transmission terminal.

(12) According to the above-described aspect, in the information processing device, the feedback device may include a non-linear output circuit configured to perform non-linear conversion on an input signal and output the signal on which the non-linear conversion has been performed.

(13) According to the above-described aspect, in the information processing device, the feedback device may include a delay circuit configured to delay an input signal.

(14) According to the above-described aspect, in the information processing device, the transmission tenninal or the reception terminal connected to the feedback device may include a diaphragm and a piezoelectric substance in contact with the diaphragm, the diaphragm may be vibrated by the waves, and the piezoelectric substance may be connected to the feedback device and receive an input of a fed-back signal.

(15) According to the above-described aspect, in the information processing device, the transmission terminal or the reception terminal connected to the feedback device may include a diaphragm, a coil fixed to the diaphragm, and a magnet surrounded by the coil, the diaphragm may be vibrated by the waves, and the coil may be connected to the feedback device and receive an input of a fed-back signal.

(16) According to the above-described aspect, the information processing device may further include a reflector, wherein the reflector may reflect the waves output from the transmission terminal to each of the plurality of reception terminals.

(17) According to a second aspect, there is provided an operation detection device including: an information processing device according to the above-described aspect; and an output device configured to output a calculation result of the information processing device externally.

The information processing device and the operation detection device according to the above aspects can recognize the more complex gesture operations of the user.

DETAILED DESCRIPTION OF THE INVENTION

Figure 1:
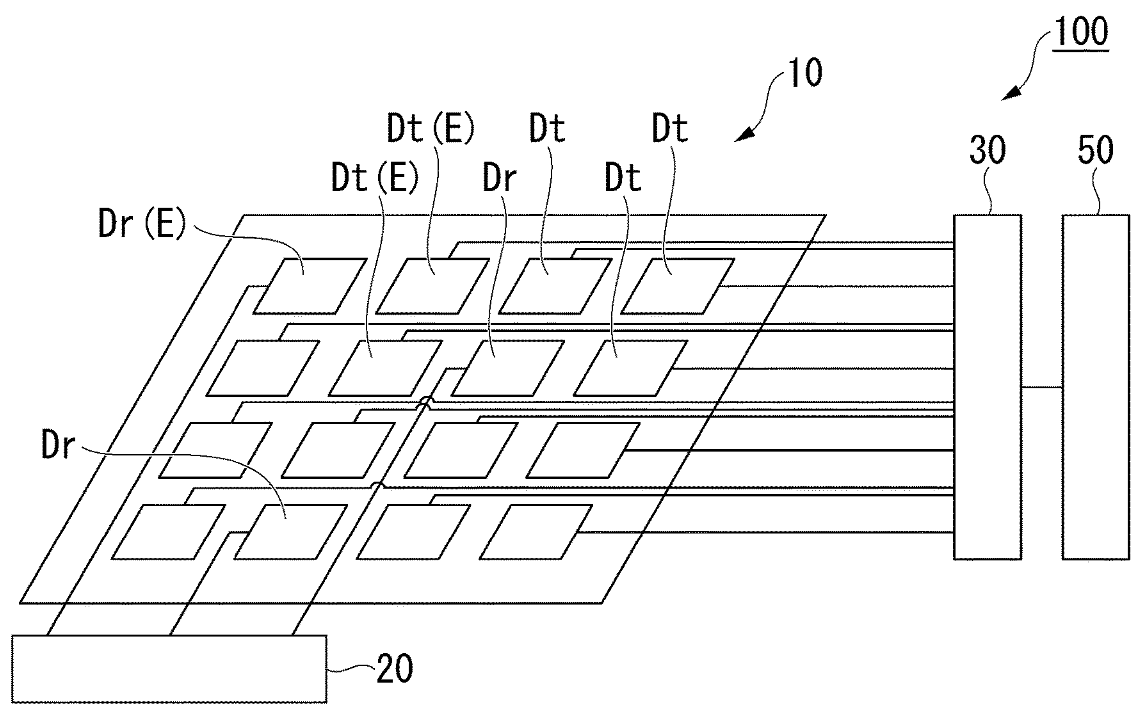
FIG. 1 is a schematic diagram of an operation detection device according to a first embodiment.

Hereinafter, embodiments will be described in detail with appropriate reference to the drawings. In the drawings used for the following description, there is a case where characteristic portions are illustrated by being enlarged for the sake of convenience so that features of the present invention are easily understood and dimensional ratios or the like of each component may be different from actual dimensional ratios or the like. Materials, dimensions, or the like exemplified in the following description are merely examples and the present invention is not limited thereto and can be carried out by being appropriately modified within a range where effects of the present invention are achieved.

First Embodiment

FIG. 1 is a schematic diagram of an operation detection device 100 according to a first embodiment. The operation detection device 100 includes an information processing device and an output device 50. The operation detection device 100 is, for example, a touch sensor, an ultrasonic sensor, or the like. In the first embodiment, an example of a touch sensor is shown. An information processing device projects an input signal in a high dimension and replaces the input signal with another signal including information of the input signal. Details of an operation of the information processing device will be described below. The output device 50 externally outputs the signal processed by the information processing device.

The information processing device includes a signal processing unit 10, a signal generator 20, and a classifier 30. The signal processing unit 10 is connected to the signal generator 20 and the classifier 30.

The signal generator 20 supplies a drive signal to a drive electrode Dr of the signal processing unit 10. The classifier 30 classifies a signal detected by the detection electrode Dt of the signal processing unit 10.

The signal processing unit 10 includes a plurality of electrodes E. The plurality of electrodes E are, for example, on a substrate. The plurality of electrodes E are, for example, separately dotted within the same plane. The arrangement of the plurality of electrodes E is not particularly limited. For example, the plurality of electrodes E are arranged in a matrix.

The plurality of electrodes E includes the drive electrode Dr and the detection electrode Dt. The drive electrode Dr is an electrode E connected to the signal generator 20. A drive signal is input from the signal generator 20 to the drive electrode Dr. The drive electrode Dr is a transmission terminal for transmitting information based on the input drive signal. The detection electrode Dt is an electrode E connected to the classifier 30. The detection electrode Dt detects information emitted from the drive electrode Dr. The detection electrode Dt receives the information output from the drive electrode Dr as a signal. At least one of the plurality of electrodes E is the drive electrode Dr. At least two of the plurality of electrodes E are detection electrodes Dt.

A positional relationship between the drive electrode Dr and the detection electrode Dt is arbitrary. For example, the drive electrode Dr is surrounded by a plurality of detection electrodes Dt. When there are a plurality of drive electrodes Dr, for example, each of the drive electrodes Dr is surrounded by a plurality of detection electrodes Dt. By surrounding the drive electrode Dr with a plurality of detection electrodes Dt, information can be detected at any position around the drive electrode Dr.

Figure 2:
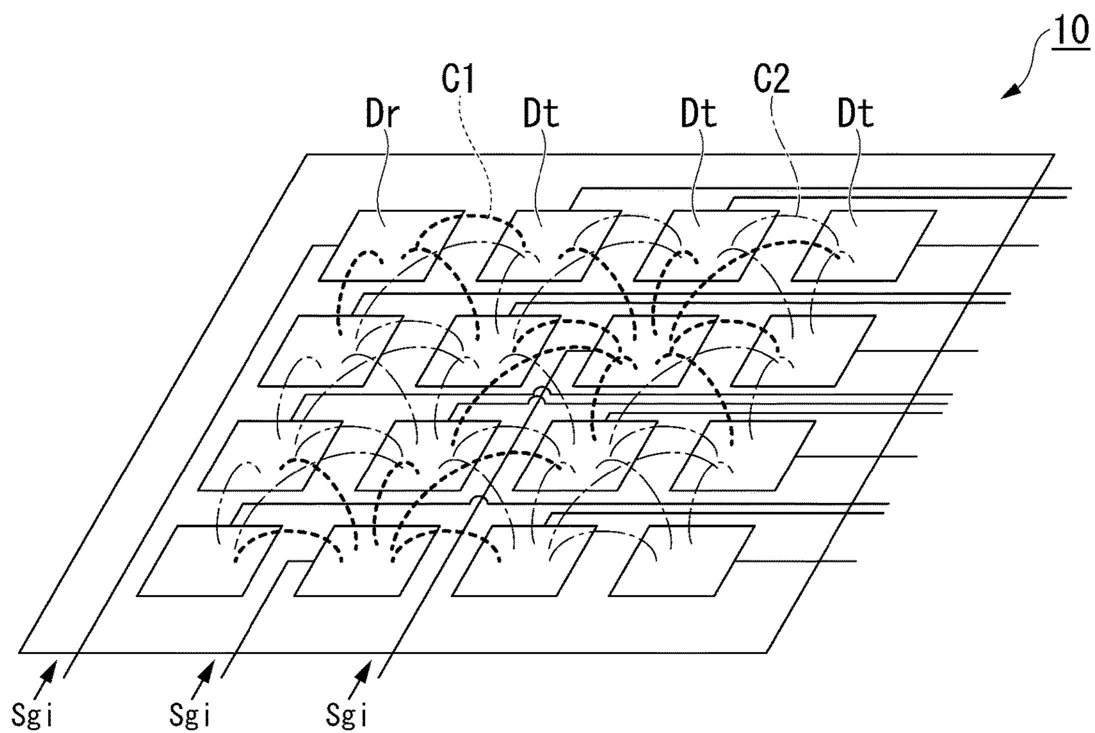
FIG. 2 is a schematic diagram of a signal processing unit of the operation detection device according to the first embodiment.

FIG. 2 is a schematic diagram of the signal processing unit 10 of the operation detection device according to the first embodiment. Each of the plurality of electrodes E generates a field. The field has a physical quantity associated with each point of space-time in which the presence of something having a physical quantity affects its surroundings. The field is, for example, an electric field, a magnetic field, a thermal field, a vibration field, or a gravitational field. The field is generated between a plurality of electrodes E that are spatially separated, and a change in the potential of one electrode E is transmitted to another electrode E via an electric field, a magnetic field, heat, vibration, or the like and the potential of the other electrode E changes.

The field generated by each of the plurality of electrodes E affects at least nearby electrodes E. As a result, each of the plurality of electrodes E interacts with at least the nearby electrodes E. The nearby electrodes E are electrodes E that first surround a certain electrode E, and are, for example, electrodes E that first come into contact with radiation that spreads radially around a certain electrode. The field generated at each of the plurality of electrodes E may affect the other electrodes E. That is, each of the plurality of electrodes E may interact with all other electrodes E.

For example, when each of the plurality of electrodes E is grounded, the potentials of the plurality of electrodes E are fixed, so that the plurality of electrodes E do not electrically interact. For example, when each of the plurality of electrodes E includes an electromagnetic field shield, the plurality of electrodes E do not electromagnetically interact.

For example, a case in which the field for connecting different electrodes is an electric field will be described as an example. The plurality of electrodes E shown in FIG. 2 have capacitive couplings C1 and C2. The capacitive coupling C1 and C2 are couplings between different electrodes E via an electric field. The different electrodes E interact through the capacitive couplings C1 and C2. The capacitive coupling C1 is a capacitive coupling between the drive electrode Dr and the detection electrode Dt and the capacitive coupling C2 is a capacitive coupling between two detection electrodes Dt.

The strengths of the capacitive couplings C1 and C2 are inversely proportional to a distance between the electrodes E. For example, a distance between the electrodes E closet to each other is less than or equal to an average dimension of the electrodes E. The strength of the capacitive coupling C2 between the two closest detection electrodes Dt is, for example, 0.25 times or more and 1.75 times or less, preferably 0.5 times or more and 1.5 times or less, and more preferably 0.75 times or more and 1.25 times or less that of the capacitive coupling C1 between the closest drive electrode Dr and the detection electrode Dt. Also, the strength of the capacitive coupling C2 between the detection electrodes Dt surrounding a certain drive electrode Dr is, for example, 0.25 times or more and 1.75 times or less, preferably 0.5 times or more and 1.5 times or less, and more preferably 0.75 times or more and 1.25 times or less that of the capacitive coupling C1 between the certain drive electrode Dr and any one of the detection electrodes Dt surrounding the drive electrode Dr.

Next, the operation of the information processing device will be described. The information processing device projects the input signal in a high dimension and replaces the input signal with another signal including the information of the input signal. The operation in the information processing device is equivalent to the process in the reservoir computing.

Reservoir computing is one means for implementing a neural network that has mimicked the human brain. In the reservoir computing, a recursive process is performed by causing signals to interact. In the reservoir computing, for example, the operation of the cerebellum is mimicked, recursive data processing is performed, and data conversion (for example, coordinate conversion) and the like are performed. The reservoir computing is a form of a recurrent neural network that can handle non-linear time-series data. Non-linear time-series data is data whose value changes over time and stock prices and the like are examples thereof.

First, the reservoir computing will be briefly described before the description of the operation of the information processing device.

Figure 3:
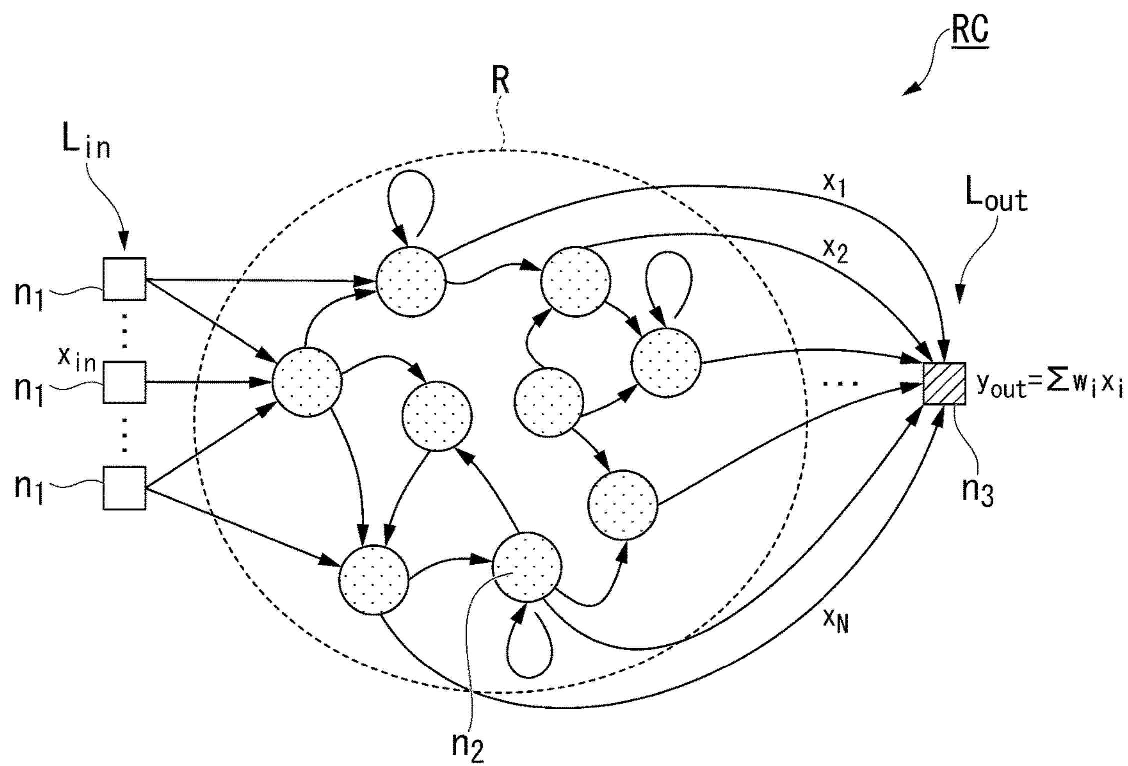
FIG. 3 is a conceptual schematic diagram of reservoir computing simulated by the information processing device according to the first embodiment.

FIG. 3 is a conceptual schematic diagram of reservoir computing RC simulated by the information processing device according to the first embodiment. The reservoir computing RC shown in FIG. 3 has an input layer $L_{in}$, a reservoir R, and an output layer $L_{out}$. The input layer $L_{in}$ and the output layer $L_{out}$ are connected to the reservoir R.

The input layer $L_{in}$ transmits the signal input from the outside to the reservoir R. The input layer $L_{in}$ includes, for example, a plurality of neurons $n_1$. Neurons are also referred to as nodes. The input signal input from the outside to each neuron $n_1$ of the input layer $L_{in}$ is transmitted to the reservoir R.

The reservoir R is an area where input signals input from the input layer $L_{in}$ are stored and the input signals interact. The reservoir R has a plurality of neurons $n_2$ randomly connected to each other. Within the reservoir R, the signals only interact and learning is not performed. When the input signals interact, the input signals change non-linearly. Also, the input signals change over time by interacting within the reservoir R. For example, the signal output from the neuron nz at a certain time t may return to the original neuron $n_2$ at a certain time t+1. In the neuron $n_2$, a process based on the signals at the time t and the time t+1 can be performed and information can be recursively processed.

The output layer $L_{out}$ outputs a signal from the reservoir R. The output layer $L_{out}$ includes, for example, a plurality of neurons $n_3$. The neuron $n_3$ is an output terminal in a neuromorphic device. Learning is performed from the reservoir R to the output layer $L_{out}$. Learning is performed by a transfer path (synapse in the brain) through which each neuron $n_2$ of the reservoir R and a neuron $n_3$ of the output layer $L_{out}$ are connected. The output layer $L_{out}$ externally outputs the learning result.

The information processing device performs an operation similar to that of the reservoir computing RC. The operation of the information processing device will be described with a comparison with the operation of the above-described reservoir computing RC.

First, as shown in FIG. 2, a drive signal Sgi is input from the signal generator 20 to the drive electrode Dr as an initial state. When the drive signal Sgi is input to the drive electrode Dr, the potential of the drive electrode Dr changes and an electric field is generated between the drive electrode Dr and the detection electrode Dt. The drive electrode Dr and the detection electrode Dt have a capacitive coupling C1 according to the above electric field. The potential of the detection electrode Dt changes due to the capacitive coupling C1. The detection electrode Dt generates an electric field in accordance with a potential difference from another detection electrode Dt and has a capacitive coupling C2. As a result, an initial state in which an electric field is formed above the plurality of electrodes E occurs. Each detection electrode Dt outputs a signal based on its potential to the classifier 30.

Figure 4:
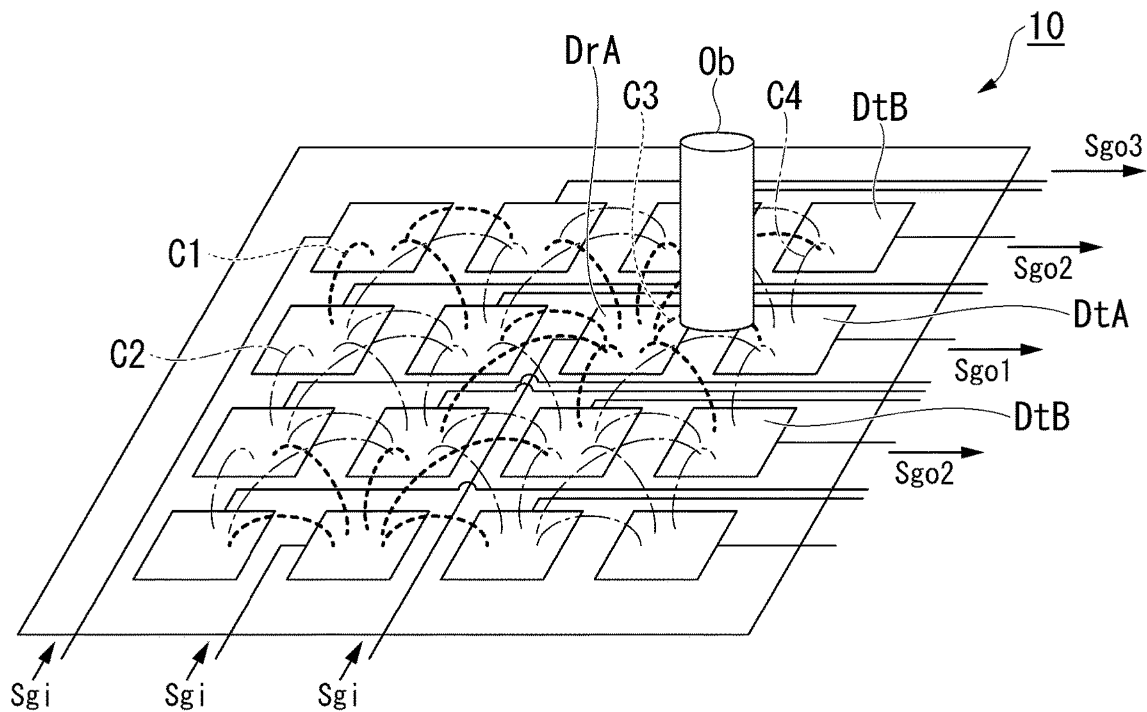
FIG. 4 is a schematic diagram for describing an operation of the operation detection device according to the first embodiment.

Next, as shown in FIG. 4, an object Ob approaches a certain position above the plurality of electrodes E. FIG. 4 is a schematic diagram for describing the operation of the information processing device according to the first embodiment. The object Ob is, for example, a user's finger. The approach of the object Ob corresponds to the input of a signal to the input layer in the reservoir computing RC.

For example, as shown in FIG. 4, the object Ob approaches between a certain drive electrode DrA and a certain detection electrode DtA. When an object Ob having a certain dielectric constant is inserted between the drive electrode DrA and the detection electrode DtA, the strength of a capacitive coupling C3 between the drive electrode DrA and the detection electrode DtA changes from the initial state. When the strength of the capacitive coupling C3 changes, the potential of the detection electrode DtA changes from the initial state. When the potential of the detection electrode DtA changes, the potential of a detection electrode DtB having the capacitive coupling C4 with the detection electrode DtA also changes. The potential change of the detection electrode DtB also propagates to the other detection electrode Dt according to the capacitive coupling between the detection electrode DtB and the other detection electrode Dt.

The change in the potential of each detection electrode Dt corresponds to the signal processing in the reservoir R of the reservoir computing RC. The reservoir R stores input signals input from the input layer $L_{in}$ and causes the input signals to interact. In the signal processing unit 10, information representing that the object Ob has approached is changed non-linearly through interaction between the plurality of electrodes E via a capacitive coupling and is replaced with information of the potential of each detection electrode Dt.

The potentials of detection electrodes DtA, DtB, and DtC become signals Sgo1, Sgo2, and Sgo3 and reach the classifier 30. The signals Sgo1, Sgo2, and Sgo3 reaching the classifier 30 are different from the initial state. The classifier 30 learns the signal output from the signal processing unit 10 when the object Ob is at a predetermined position. The process in the classifier 30 corresponds to the signal processing in the output layer $L_{out}$ of the reservoir computing RC.

The classifier 30 learns a relationship between the state of the object Ob and the signal output from the signal processing unit 10. The classifier 30 identifies the state of the object Ob by classifying the signal output from the signal processing unit 10. The state of the object Ob is, for example, a position, a shape, a material, a size, an operation, or the like of the object Ob.

The classifier 30 includes, for example, a plurality of variable resistors arranged in a matrix, a plurality of first bit lines connected to variable resistors in the same row, and a plurality of second bit lines connected to variable resistors in the same column. The variable resistor is, for example, a magnetic domain wall moving element. A weight obtained as a result of learning is applied to each of the variable resistors. A resistance value of each variable resistor differs according to the weight applied to each variable resistor.

The signal input to the classifier 30 is transmitted through each of the first bit lines and reaches each variable resistor. A resistance value of each variable resistor differs according to the applied weight and the product operation is performed by causing the signal to pass through each variable resistor. The result of the product operation performed by each variable resistor is transmitted to the second bit line. Results of product operations of the variable resistors connected to the same second bit line are aggregated in the same second bit line and subjected to a sum operation.

The operation detection device 100 according to the first embodiment recognizes the operation of the object Ob on the basis of the signal reaching the classifier 30. The operation detection device 100 according to the first embodiment converts the input signal non-linearly and converts the input signal with new information through the interaction of the plurality of electrodes E. Because the input signal and the output signal have a non-linear relationship, the operation detection device 100 according to the first embodiment can extract an output signal focusing only on necessary information. Also, the operation detection device 100 according to the first embodiment can read the operation of the object Ob more quickly without having to perform a line scan.

Although the present invention has been described above in detail using the operation detection device 100 of the first embodiment as an example, the configuration of the operation detection device 100 is not limited to the above embodiments and various modifications and changes can be made.

Figure 5:
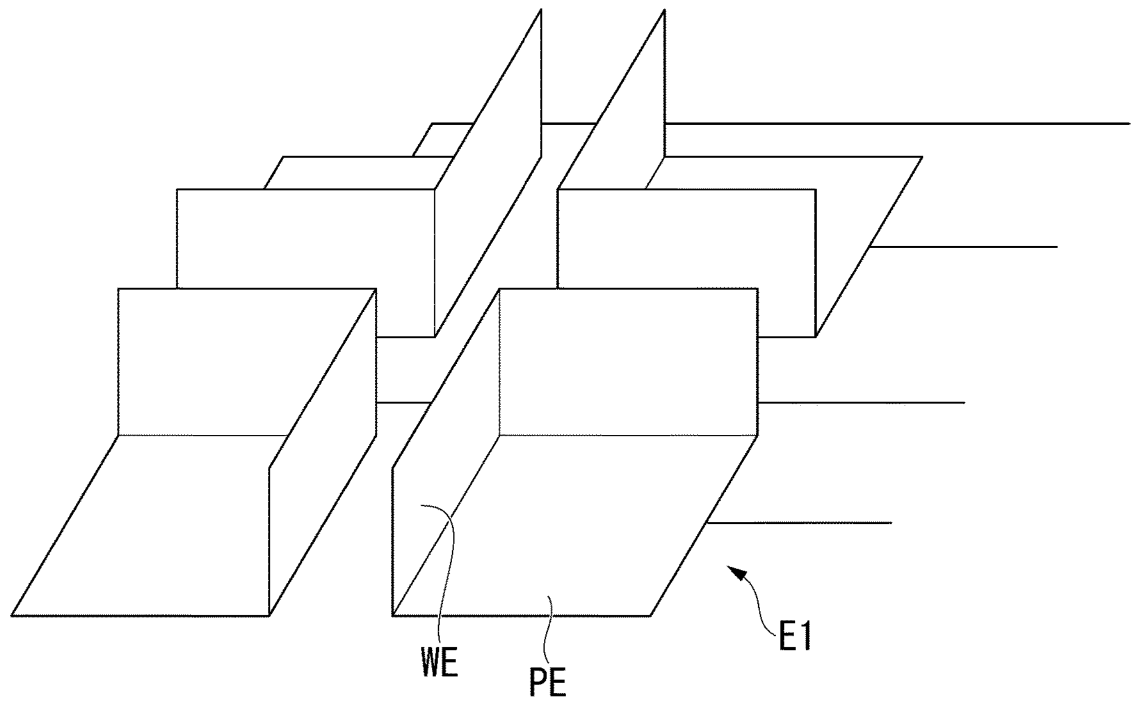
FIG. 5 is a schematic diagram of a signal processing unit according to a first modified example.
Figure 6:
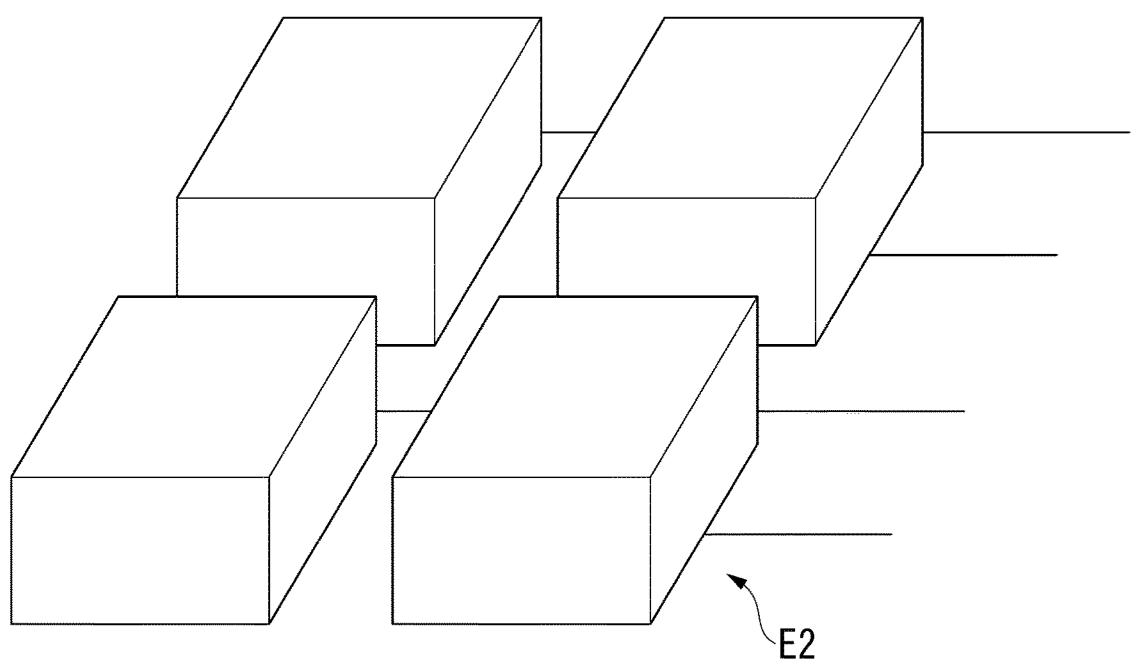
FIG. 6 is a schematic diagram of a signal processing unit according to a second modified example.

For example, the electrode is not limited to a flat surface electrode shown in FIG. 1. For example, like the electrode E1 shown in FIG. 5, the electrode E1 may have a flat surface portion PE and a wall surface portion WE. The wall surface portion WE is upright from the flat surface portion PE. When wall surface portions WE face each other at the adjacent electrodes E1, the capacitive coupling between the adjacent electrodes E1 is strengthened. Likewise, as shown in FIG. 6, the electrode E2 may have a columnar body.

Figure 7:
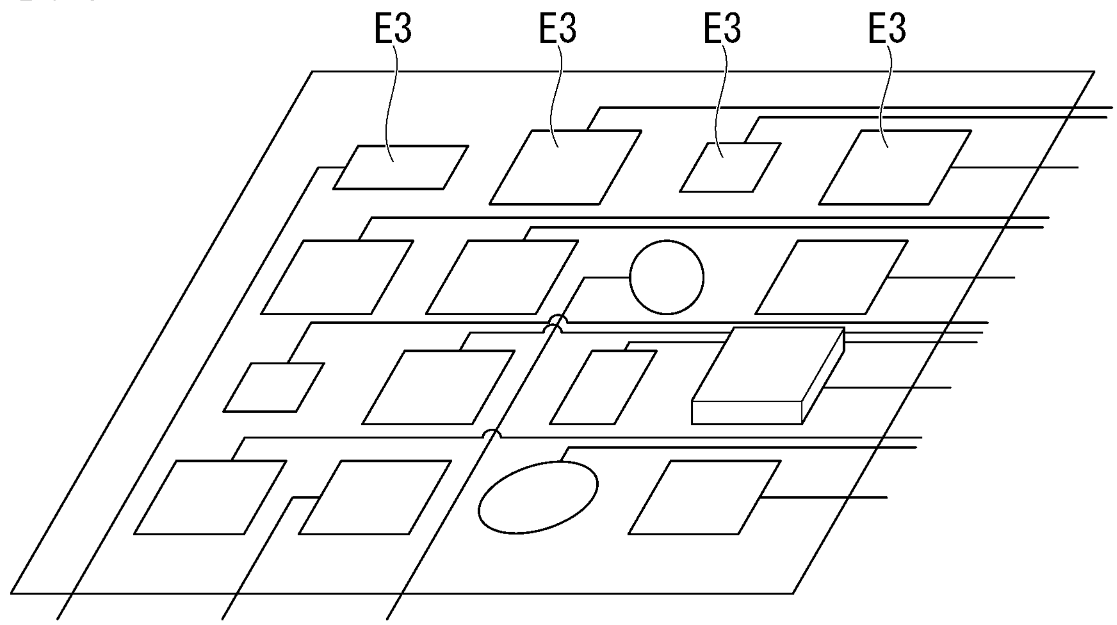
FIG. 7 is a schematic diagram of a signal processing unit according to a third modified example.

Also, as shown in FIG. 7, at least one of the plurality of electrodes E3 may have a shape different from those of the other electrodes E3. The shape of each of the plurality of electrodes E3 does not have to be fixed. A plan-view shape of the electrode E3 may be circular, rectangular, or irregular. Also, the flat surface electrode and the three-dimensional electrode may be mixed in the plurality of electrodes E3. When the shape of each electrode E3 is different, the strength of the capacitive coupling between the electrodes differs according to each pair of electrodes. If the strength of the capacitive coupling differs according to each place, the operation detection device 100 can convert the input signal more non-linearly.

Figure 8:
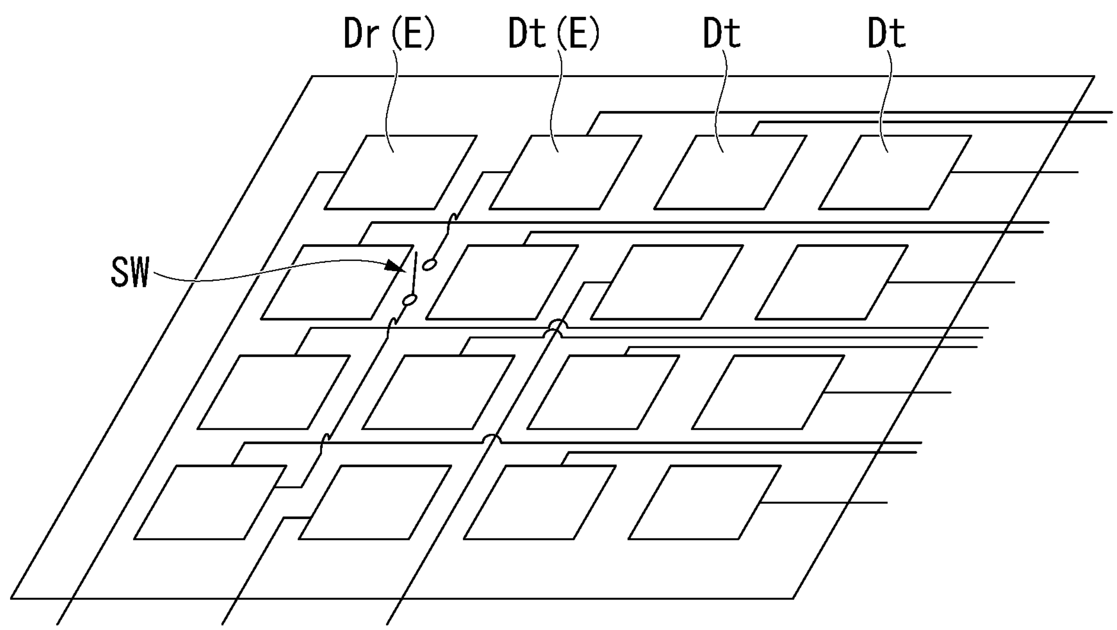
FIG. 8 is a schematic diagram of a signal processing unit according to a fourth modified example.

Also, as shown in FIG. 8, at least two of the plurality of electrodes E may be electrically connected via the switching element SW. When the switching element SW is connected, the two connected electrodes E are equipotential. When the potential of the electrode E changes, the strength of the capacitive coupling also changes. When the switching element SW is switched, an electric field formed above the plurality of electrodes E is switched. That is, the initial state of the signal processing unit 10 is also one of the parameters that can be changed and the signal processing unit 10 can read more information from the object Ob.

Figure 9:
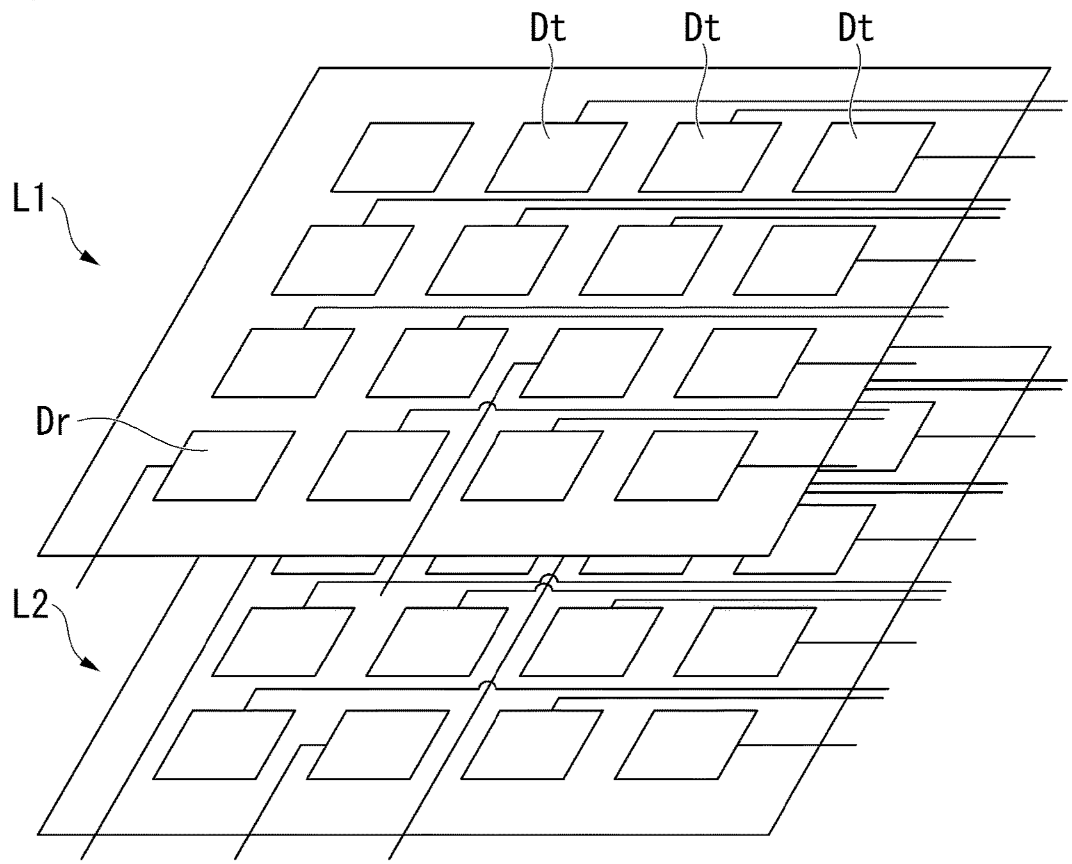
FIG. 9 is a schematic diagram of a signal processing unit according to a fifth modified example.

Also, as shown in FIG. 9, the plurality of electrodes E may be in layers L1 and L2 of different layers. An electrode group belonging to the layer L1 and an electrode group belonging to the layer L2 are in different layers. For example, there is a dielectric substance between the electrode group of the layer L1 and the electrode group of the layer L2. The electrode E of the layer L1 and the electrode E of the layer L2 may interact. The electrodes E of the layer L1 may be all the drive electrodes Dr and all the electrodes E of the layer L2 may be the detection electrodes Dt. A reverse relationship may also be used. Each of the electrode groups of the layer L1 and the layer L2 may include a drive electrode Dr and a detection electrode Dt.

Figure 10:
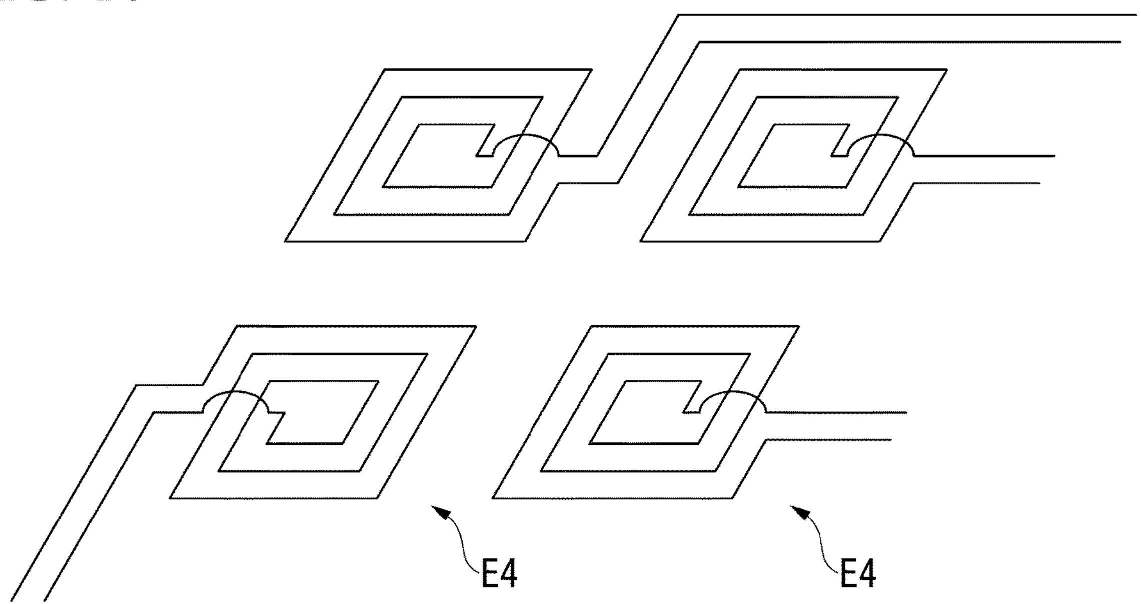
FIG. 10 is a schematic diagram of a signal processing unit according to a sixth modified example.

Although the capacitive coupling has been described above as an example of a medium responsible for the interaction between a plurality of electrodes E, the medium responsible for the interaction may be electromagnetic induction. That is, each of the plurality of electrodes E may interact with the other electrodes E via a magnetic field. As shown in FIG. 10, electromagnetic induction is generated between the electrodes E4 by forming the electrodes E4 in a coil shape. Also, as a medium responsible for the interaction between the plurality of electrodes E, the capacitive coupling (an electric field) and the electromagnetic induction (a magnetic field) may be used in combination.

Second Embodiment

Figure 11:
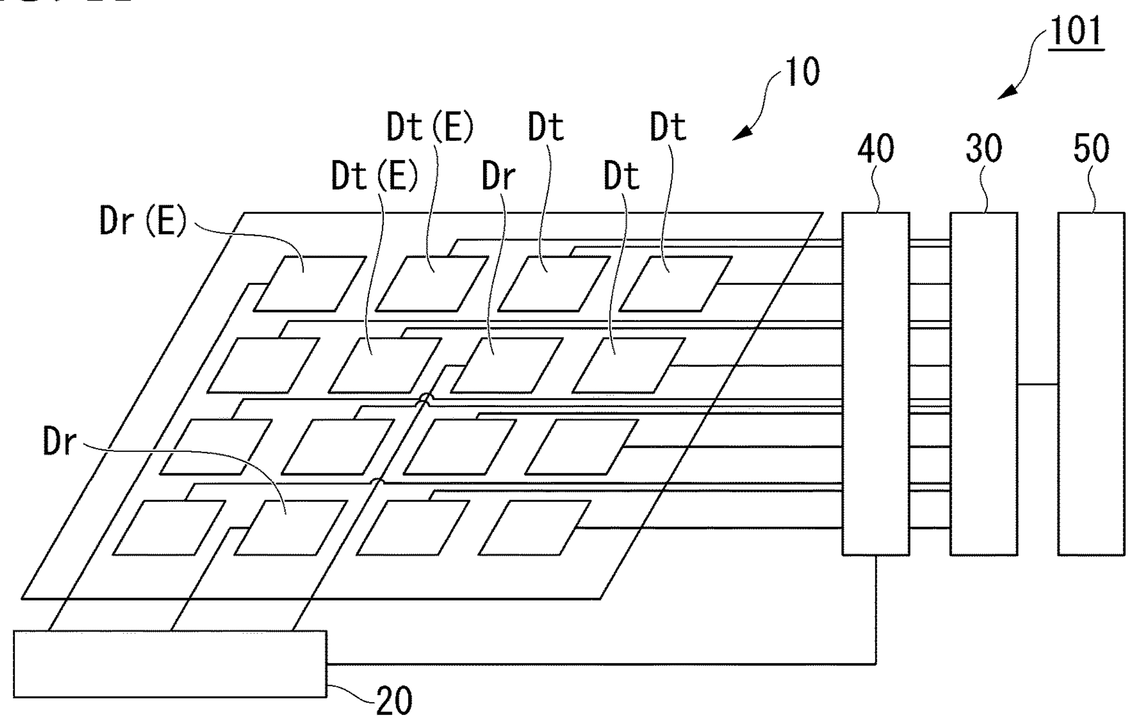
FIG. 11 is a schematic diagram of an operation detection device according to a second embodiment.

The operation detection device 101 shown in FIG. 11 includes an information processing device and an output device 50. The information processing device includes a signal processing unit 10, a signal generator 20, a classifier 30, and a feedback device 40. The operation detection device 101 is different from the operation detection device 100 in that the feedback device 40 is provided. Hereinafter, differences between the operation detection device 101 and the operation detection device 100 will be described in detail and the description of a similar configuration will be omitted.

The feedback device 40 is located between the detection electrode Dt of the signal processing unit 10 and the classifier 30. The feedback device 40 returns part of a signal detected by a detection electrode Dt to the signal generator 20.

The feedback device 40 includes, for example, a signal retention unit and a signal transmission unit. The signal retention unit temporarily retains the signal from the detection electrode Dt. The signal transmission unit transmits the signal retained by the signal retention unit to the signal generator 20 after the elapse of a certain period.

The operation detection device 101 returns a signal output at the time t to the signal generator 20 and uses the signal for the calculation at the time t+1. A signal at the previous time t includes information of a touch position at the previous time t. That is, the current operation of the user can be read on the basis of the previous operation of the user. As a result, the operation detection device 101 can read the more complex gestures of the user.

Figure 12:
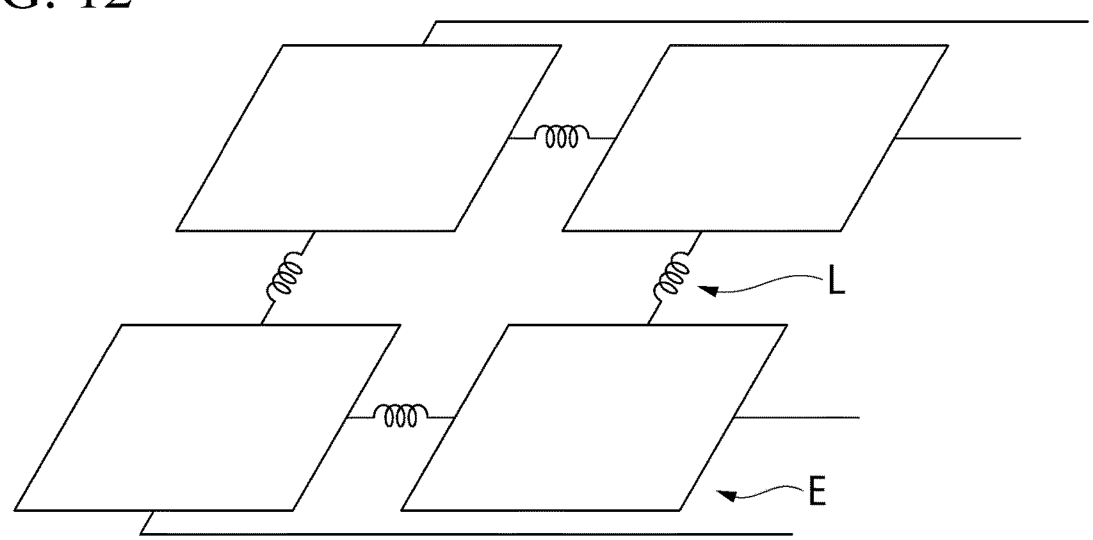
FIG. 12 is a schematic diagram of a signal processing unit according to a seventh modified example.

Also, as shown in FIG. 12, at least two of the plurality of electrodes may be connected via the circuit L instead of the feedback device 40 or together with the feedback device 40. The circuit L has at least one selected from a group consisting of a resistor, a capacitor, and a coil. The circuit L is, for example, an LCR circuit. The circuit L causes a transient phenomenon.

The decay time of the circuit L is, for example, twice or more the unit time length of the time change in the signal input to the drive electrode Dr. The decay time of the circuit L is, for example, twice or more an interval between signals input to the drive electrode Dr. The decay time of the circuit L is a time period until the intensity of the signal input to the circuit L becomes 1/e.

When the circuit L causes a transient phenomenon, the signal input at the time t is retained in the circuit L and used for the calculation at the time t+1. That is, the current operation of the user can be read on the basis of the previous operation of the user.

Third Embodiment

Figure 13:
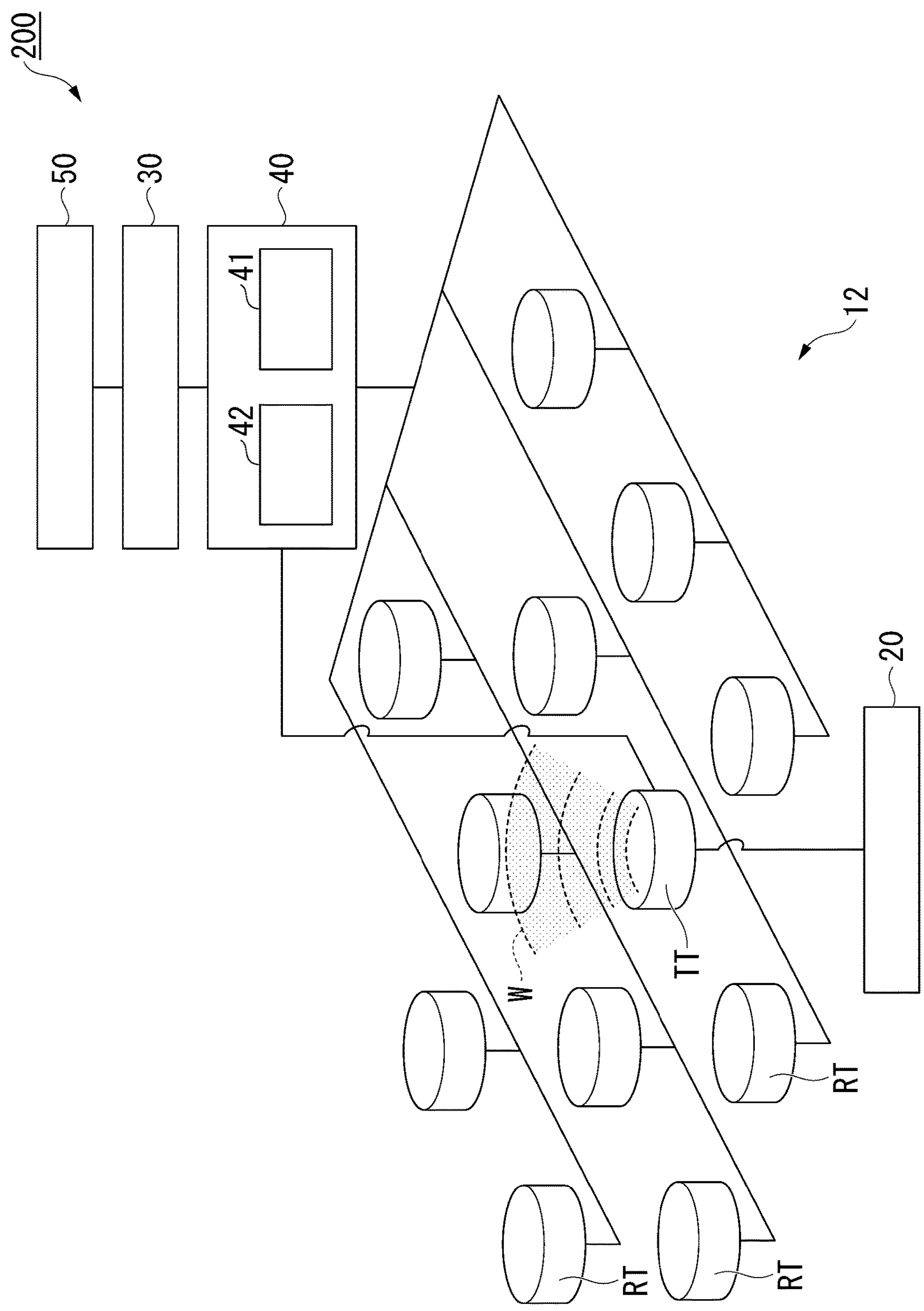
FIG. 13 is a schematic diagram of an operation detection device according to a third embodiment.

FIG. 13 is a schematic diagram of an operation detection device 200 according to a third embodiment. The operation detection device 200 includes an information processing device and an output device 50. The operation detection device 200 is, for example, a touch sensor, an ultrasonic sensor, or the like. In the third embodiment, an example of an ultrasonic sensor is shown. The information processing device projects an input signal in a high dimension and replaces the input signal with another signal including information of the input signal. Details of the operation of the information processing device will be described below. The output device 50 externally outputs the signal processed by the information processing device.

The information processing device includes a signal processing unit 12, a signal generator 20, a classifier 30, and a feedback device 40. A specific configuration of the information processing device is different from that of the operation detection device 101 according to the second embodiment. The signal generator 20 supplies a signal to a transmission terminal TT of the signal processing unit 12.

The signal processing unit 12 has, for example, a transmission terminal TT and a plurality of reception terminals RT. The number of transmission terminals TT may be two or more. The number of transmission terminals TT, the number of reception terminals RT, and the arrangements thereof are arbitrary.

The transmission terminal TT outputs the signal input from the signal generator 20 as waves w. The waves w are, for example, ultrasonic waves, electromagnetic waves, or the like. Each of the plurality of reception terminals RT receives the waves w. The state of the waves w received by the plurality of reception terminals RT changes according to a position, a shape, a material, a size, an operation, or the like of the object approaching the signal processing unit 12. The operation detection device 200 detects the position, the shape, the material, the size, the operation, or the like of the object approaching the signal processing unit 12 according to a change in the state of the waves w. The number of transmission terminals TT, the number of reception terminals RT, and the arrangements thereof are arbitrary.

Each of the transmission terminal TT and the reception terminal RT has a diaphragm. The transmission terminal TT outputs waves w when the diaphragm is vibrated by a signal input from the signal generator 20. The reception terminal RT converts the movement of the diaphragm vibrated by the waves w into a signal. The reception terminal RT interacts with another reception terminal RTs via the waves w or wiring.

The feedback device 40 is connected to the reception terminal RT and the transmission terminal TT. The feedback device 40 feeds the signal received by the reception terminal RT back to the transmission terminal TT.

Although an example in which all reception terminals RT are connected to the feedback device 40 is shown in FIG. 13, only some reception terminals RT may be connected to the feedback device 40. The reception terminal RT connected to the feedback device 40 is referred to as a first reception terminal. When only some reception terminals RT are connected to the feedback device 40, the other reception terminals RT are directly connected to the classifier 30.

Figure 14:
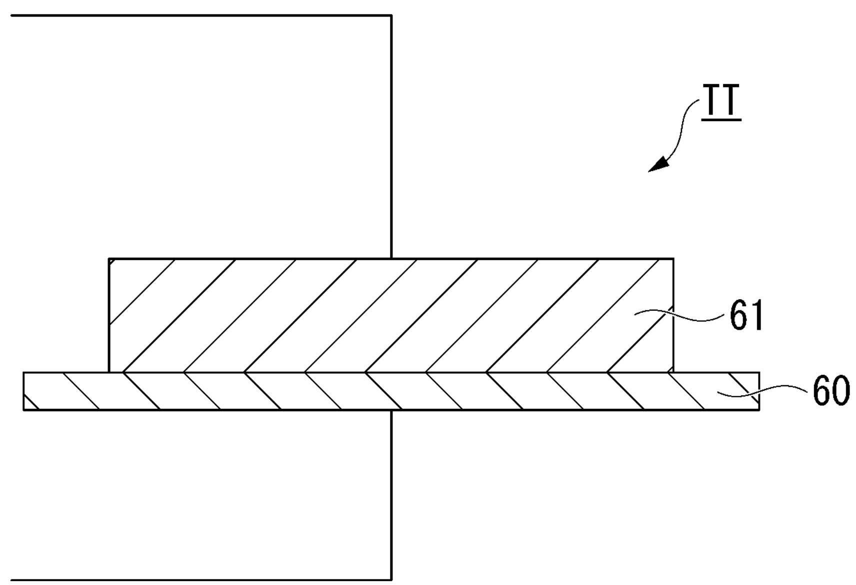
FIG. 14 is a schematic diagram of an example of a transmission terminal connected to a feedback device.

FIG. 14 is a schematic diagram of an example of the transmission terminal TT connected to the feedback device 40. The transmission terminal TT connected to the feedback device 40 includes, for example, a diaphragm 60 and a piezoelectric substance 61. The piezoelectric substance 61 is in contact with the diaphragm 60.

The piezoelectric substance 61 is connected to the feedback device 40. An electrical signal transmitted from the feedback device 40 is input to the piezoelectric substance 61 and the piezoelectric substance 61 vibrates on the basis of the electrical signal. The diaphragm 60 vibrates on the basis of the signal input from the signal generator 20. The transmission terminal TT superimposes the vibration of the diaphragm 60 on the vibration of the piezoelectric substance 61 and outputs the vibrations as waves w. The vibration of the piezoelectric substance 61 becomes a signal fed back to the signal processing unit 12.

Figure 15:
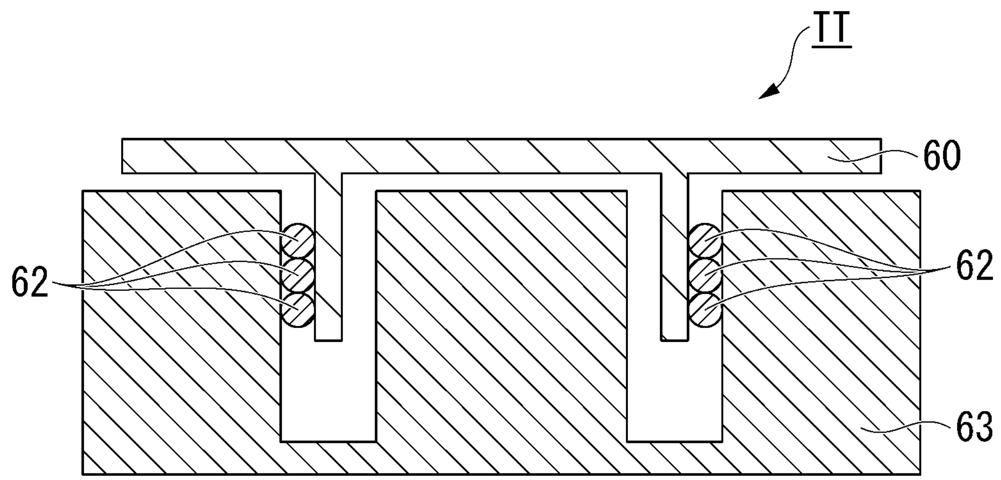
FIG. 15 is a schematic diagram of another example of a transmission terminal connected to a feedback device.

FIG. 15 is a schematic diagram of another example of the transmission terminal TT connected to the feedback device 40. The transmission terminal TT connected to the feedback device 40 includes, for example, a diaphragm 60, a coil 62, and a magnet 63. The coil 62 surrounds a convex portion of the magnet 63. When an electric current flows through the coil 62, an electromagnetic force is generated inside the coil 62. The coil 62 is fixed to the diaphragm 60.

The coil 62 is connected to the feedback device 40. An electrical signal transmitted from the feedback device 40 flows through the coil 62 as an electric current. The coil 62 modulates the vibration of the diaphragm 60 according to an electromagnetic force generated by the electric current. The transmission terminal TT outputs waves w based on the vibration of the diaphragm 60 modulated according to the electric current flowing through the coil 62. When the reception terminal RT has the diaphragm 60, the coil 62 moves up and down around the magnet 63 with the vibration of the diaphragm 60, so that the waves can be converted into a signal.

Also, as shown in FIG. 13, the feedback device 40 includes, for example, a non-linear output circuit 41 and a delay circuit 42.

The non-linear output circuit 41 non-linearly converts the input signal and outputs the converted signal. As described above, the reservoir R performs non-linear conversion of the input signals by causing the input signals to interact and performs recursive data processing, data conversion (for example, coordinate conversion), and the like. By inputting the non-linearly converted signal from the non-linear output circuit 41 to the signal processing unit 12, more complex signal processing can be performed.

The delay circuit 42 delays the input signal. The delay circuit 42 has a function similar to that of the signal retention unit according to the second embodiment. The delay circuit 42 temporarily retains the input signal and returns the signal to the signal processing unit 12 after the elapse of a certain period. By inputting previous information to the signal processing unit 12 in time series, it is possible to read the current operation of the user on the basis of the previous operation of the user. As a result, the operation detection device 101 can read more complex gestures of the user.

The operation detection device 200 according to the third embodiment can recognize a position, a shape, a size, an operation, or the like of the object on the basis of the signal reaching the classifier 30. The operation detection device 200 according to the third embodiment can read the operation of an object or the like more quickly without having to perform a line scan.

Although the present invention has been described in detail using the operation detection device 200 of the third embodiment as an example, the configuration of the operation detection device 200 is not limited to the above embodiments and various modifications and changes can be made.

For example, the operation detection device 200 of the third embodiment can be modified as in the first and second embodiments. For example, the shapes of the transmission terminal TT and the reception terminal RT do not have to be fixed. Also, a propagator for transmitting vibrations may be provided between the transmission terminal TT and the reception terminal RT and between different reception terminals RT. Also, the transmission terminal TT and the reception terminal RT may be formed across different layers. Also, the circuit L (FIG. 12) may be provided between the transmission terminal TT and the reception terminal RT and between different reception terminals RT instead of the feedback device 40 or together with the feedback device 40.

Figure 16:
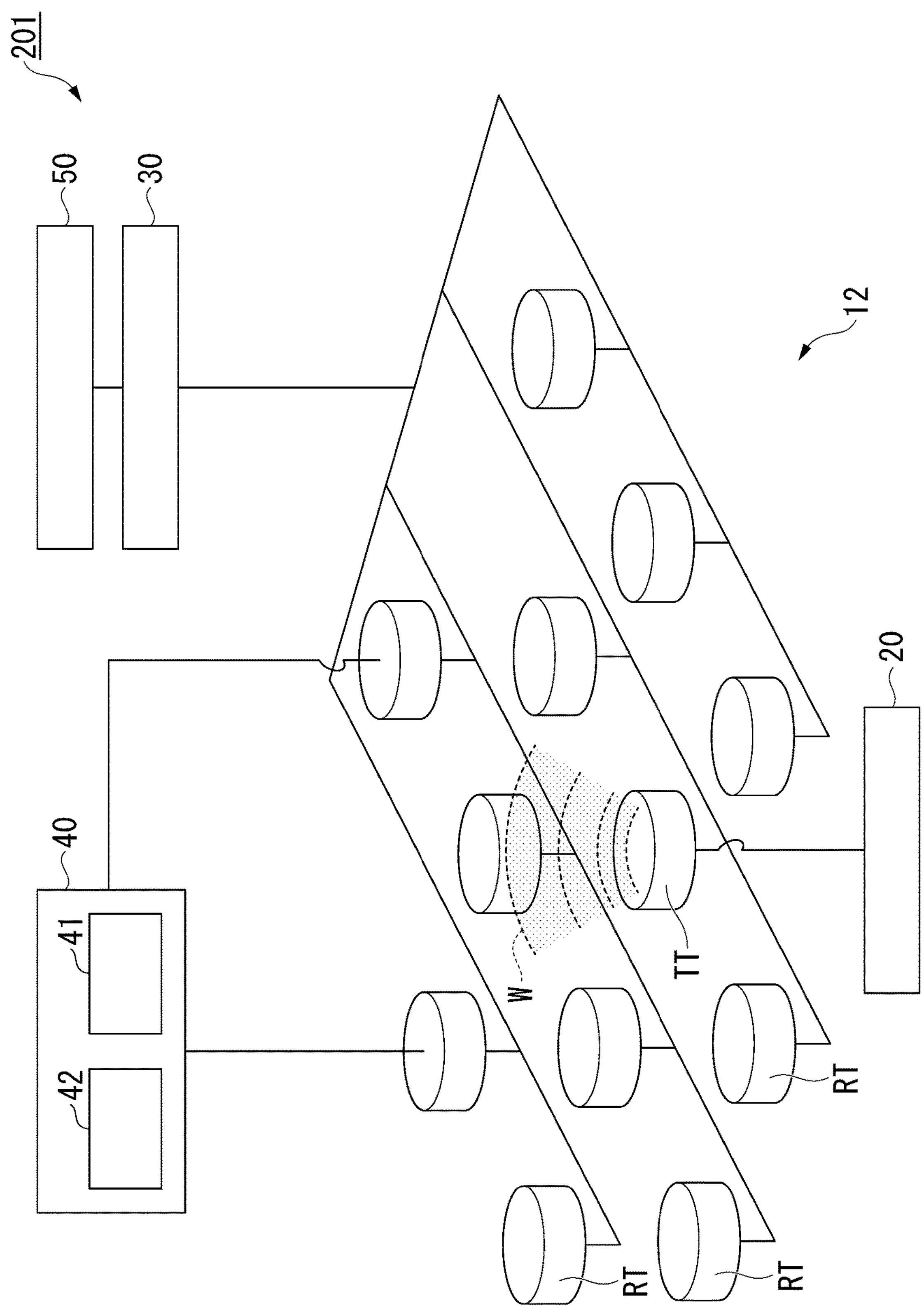
FIG. 16 is a schematic diagram of an operation detection device according to an eighth modified example.

Also, for example, as in the operation detection device 201 shown in FIG. 16, the feedback device 40 may be connected to two different reception terminals RT. One reception terminal RT is referred to as a first reception terminal, and the other reception terminal RT is referred to as a second reception terminal. The feedback device 40 feeds the signal received by the first reception terminal back to the second reception terminal. In this case, the reception terminal RT connected to the feedback device 40 has the configuration shown in FIG. 14 or 15. By feeding the signal back to the signal processing unit 12, different time-series information is input to the signal processing unit 12. As a result, the operation detection device 201 can detect more complex operations and the like.

Figure 17:
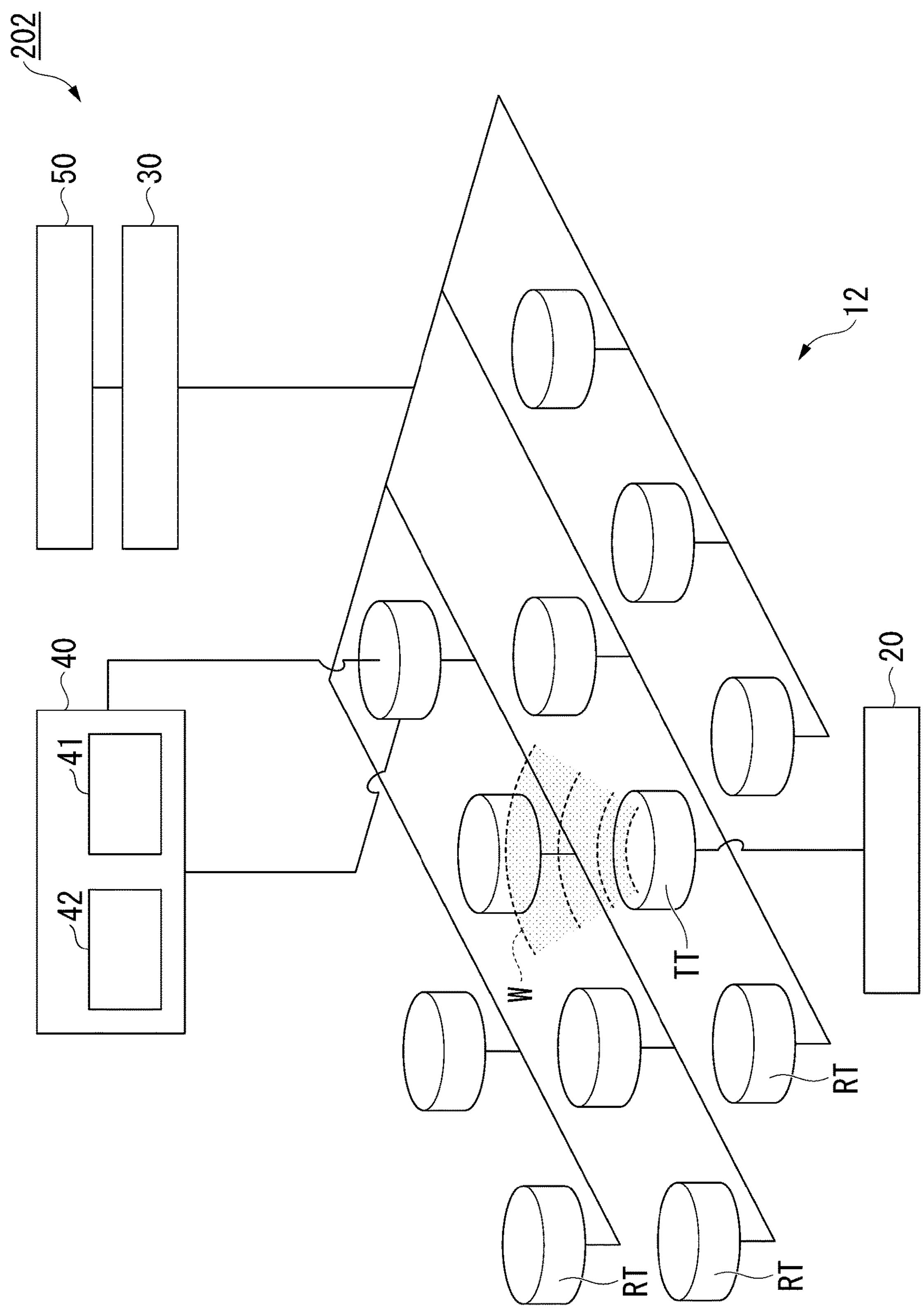
FIG. 17 is a schematic diagram of an operation detection device according to a ninth modified example.

Also, for example, as in the operation detection device 202 shown in FIG. 17, the feedback device 40 may be connected to one reception terminal RT. The feedback device 40 feeds the signal received by the reception terminal RT back to the same reception terminal RT again. In this case, the reception terminal RT connected to the feedback device 40 has the configuration shown in FIG. 14 or 15. By feeding the signal back to the signal processing unit 12, different time-series information is input to the signal processing unit 12. As a result, the operation detection device 202 can detect more complex operations and the like.

Figure 18:
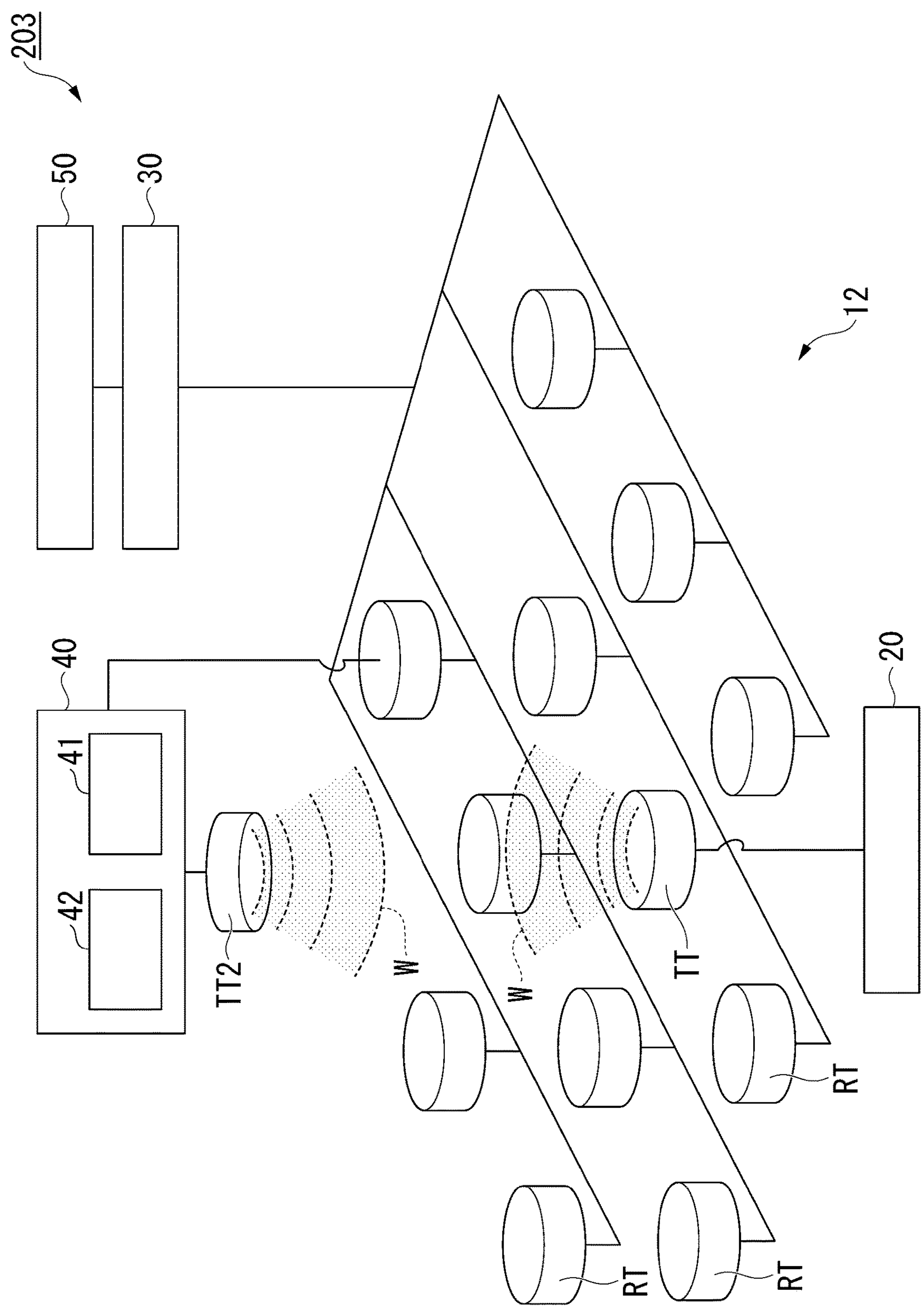
FIG. 18 is a schematic diagram of an operation detection device according to a tenth modified example.

Also, for example, as in the operation detection device 203 shown in FIG. 18, the feedback device 40 may be connected to the reception terminal RT and the external transmission terminal TT2. The feedback device 40 transmits the signal received by the reception terminal RT to the external transmission terminal TT2. The external transmission terminal TT2 outputs waves w2 based on the transmitted signal. When the transmission terminal TT and the reception terminal RT receive the waves w2, the signal is indirectly fed back to the transmission terminal TT or the reception terminal RT. The configuration of the external transmission terminal TT2 is similar to that of the transmission terminal TT described above. Even if the feedback is indirect, the signal is fed back to the signal processing unit 12, so that information in different time series is input to the signal processing unit 12. As a result, the operation detection device 203 can detect more complex operations and the like.

Figure 19:
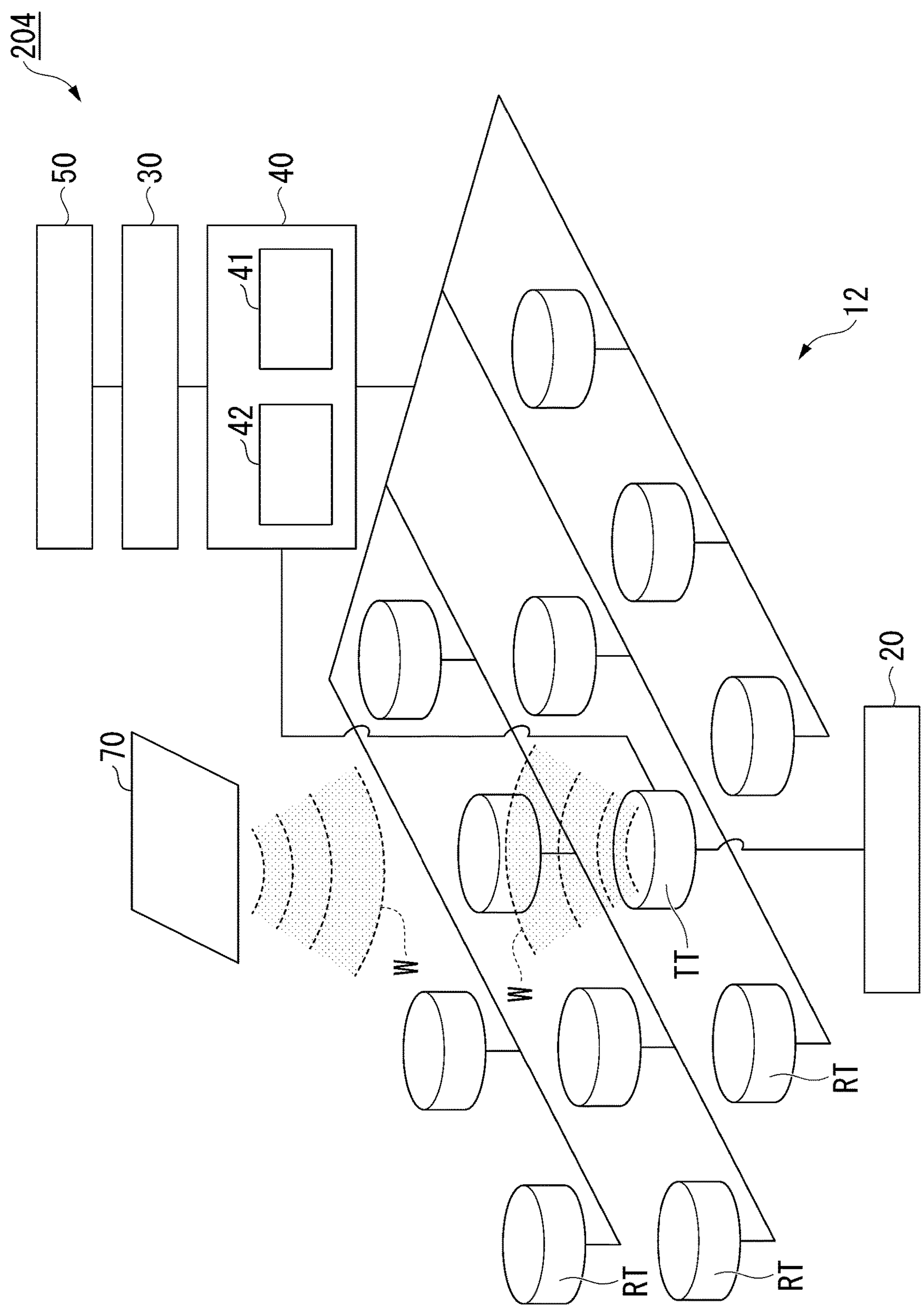
FIG. 19 is a schematic diagram of an operation detection device according to an eleventh modified example.

Also, for example, as in the operation detection device 204 shown in FIG. 19, the reflector 70 may be provided at a position where the waves w generated at the transmission terminal TT can be reflected. The reflector 70 reflects the waves generated from the transmission terminal TT toward the reception terminal RT. The reflector 70 is, for example, a mirror. The reflector 70 is a substitute for the object. That is, the operation detection device 204 can function as the reservoir R even when there is no object. The operation detection device 204 is not limited to the purpose of detecting gestures and the like and functions as an element for implementing the reservoir computing RC.

Figure 20:
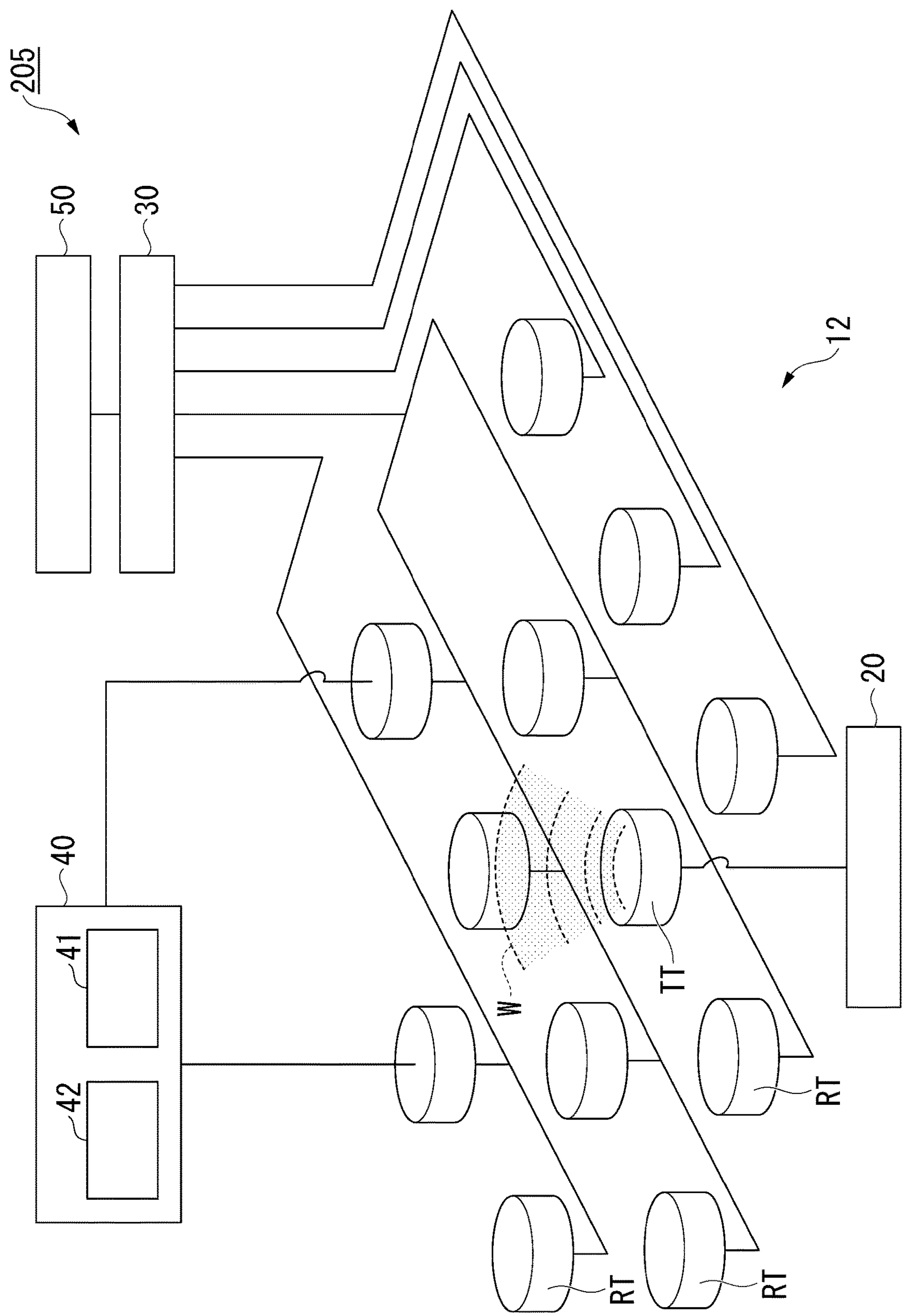
FIG. 20 is a schematic diagram of an operation detection device according to a twelfth modified example.

Also, for example, as in the operation detection device 205 shown in FIG. 20, some reception terminals RT may be independently connected to the classifier 30. Also, all the reception terminals RT may be independently connected to the classifier 30. Also, even if a plurality of reception terminals RT are connected to the classifier 30 after merging with the wiring, the number of reception terminals RT connected to the wiring does not matter. Although the operation detection device 205 is shown as a modified example of the operation detection device 201 in FIG. 20, the same is true for other operation detection devices. That is, in any one of the operation detection devices 200 to 204, it is not necessary for outputs from all the reception terminals RT to reach the classifier 30 after merging with the wiring and some reception terminals RT may be independently connected to the classifier 30.

EXPLANATION OF REFERENCES

10, 12 Signal processing unit
20 Signal generator
30 Classifier
40 Feedback device
41 Non-linear output circuit
42 Delay circuit
50 Output device
60 Diaphragm
61 Piezoelectric substance
62 Coil
63 Magnet
70 Reflector
100, 101, 200, 201, 202, 203 Operation detection device
C1, C2, C3, C4 Capacitive coupling
Dr, DrA Drive electrode
Dt, DtA, DtB, DtC Detection electrode
E, E1, E2, E3, E4 Electrode
L Circuit
L1, L2 Layer
$L_{in}$ Input layer
$L_{out}$ Output layer
$n_1$, $n_2$, $n_3$ Neuron
R Reservoir
RC Reservoir computing
Ob Object
PE Flat surface
RT Reception terminal
SW Switching element
TT Transmission terminal
TT2 External transmission terminal
WE Wall surface portion

What is claimed is:

1. An information processing device comprising:
a transmission terminal configured to transmit an input signal and output waves as a signal;
a plurality of reception terminals configured to receive waves output from the transmission terminal as a signal; and
a feedback device configured to feed a signal received by a first reception terminal among the plurality of reception terminals back to the transmission terminal or any reception terminal,
wherein a signal received by one of the plurality of reception terminals is configured to be able to interact with signals received by the other reception terminals,
the transmission terminal or the reception terminal connected to the feedback device includes a diaphragm and a piezoelectric substance in contact with the diaphragm,
the diaphragm is able to be vibrated by the waves, and
the piezoelectric substance is connected to the feedback device and is configured to receive an input of a fed-back signal.

2. An information processing device comprising:
a transmission terminal configured to transmit an input signal and output waves as a signal;
a plurality of reception terminals configured to receive waves output from the transmission terminal as a signal; and
a feedback device configured to feed a signal received by a first reception terminal among the plurality of reception terminals back to the transmission terminal or any reception terminal,
wherein a signal received by one of the plurality of reception terminals is configured to be able to interact with signals received by the other reception terminals,
the transmission terminal or the reception terminal connected to the feedback device includes a diaphragm, a coil fixed to the diaphragm, and a magnet surrounded by the coil,
the diaphragm is able to be vibrated by the waves, and
the coil is connected to the feedback device and is configured to receive an input of a fed-back signal.

* * * * *